Sept. 2, 1958  J. F. JOY  2,850,272
ROTARY BORING HEAD HAVING ROTARY CUTTER WHEELS
Original Filed June 30, 1952  2 Sheets-Sheet 1

INVENTOR:
JOSEPH F. JOY
BY
Charles F. Osgood,
ATTORNEY

Sept. 2, 1958    J. F. JOY    2,850,272
ROTARY BORING HEAD HAVING ROTARY CUTTER WHEELS
Original Filed June 30, 1952    2 Sheets-Sheet 2
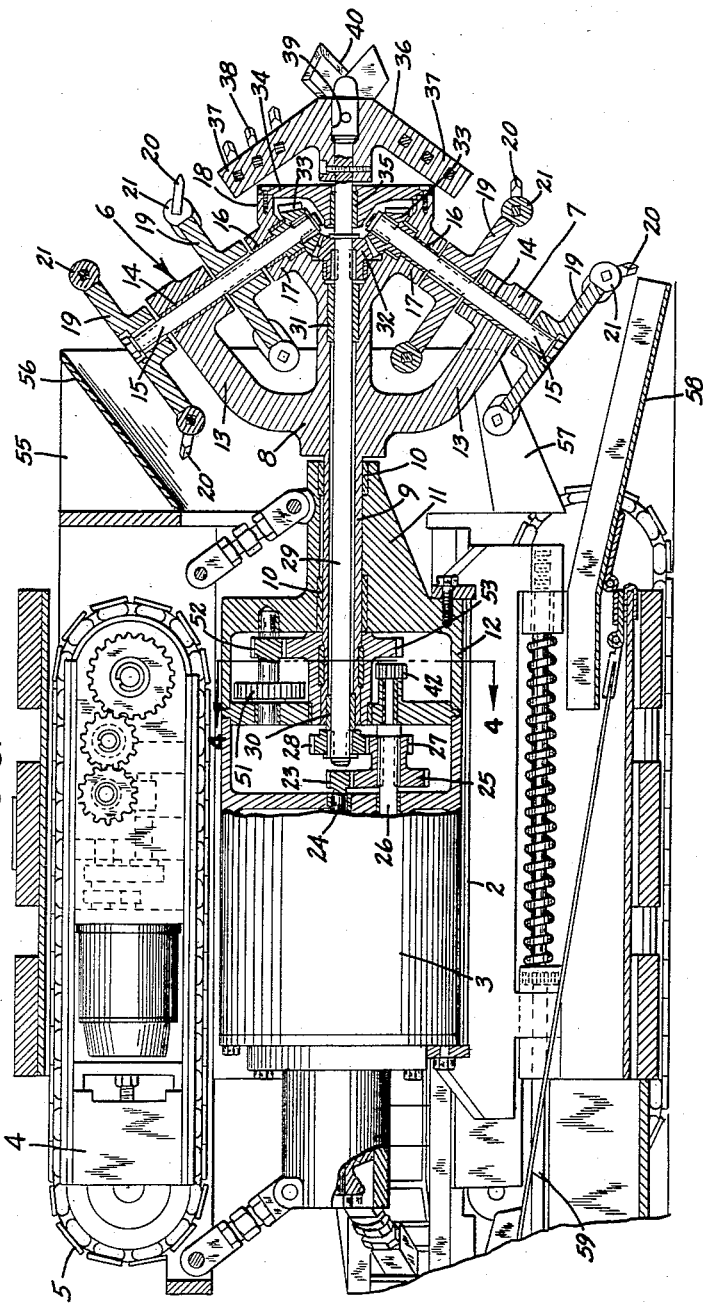
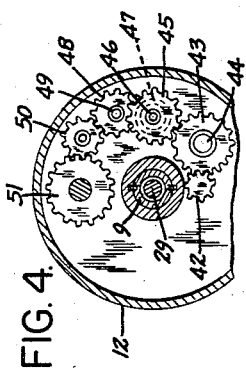
INVENTOR:
JOSEPH F. JOY
BY
Charles F. Osgood,
ATTORNEY 2,850,272
Patented Sept. 2, 1958

2,850,272
ROTARY BORING HEAD HAVING ROTARY CUTTER WHEELS

Joseph F. Joy, Pittsburgh, Pa., assignor to Joy Manufacturing Company, Pittsburgh, Pa., a corporation of Pennsylvania Original application June 30, 1952, Serial No. 296,324. Divided and this application August 30, 1954, Serial No. 453,106

1 Claim. (Cl. 262—7)

This invention relates to a shaft or tunnel boring apparatus and more particularly to a rotary boring head for such an apparatus.

This application is a division of my copending application Serial No. 296,324, filed June 30, 1952.

An object of the present invention is to provide an improved shaft or tunnel boring apparatus. Another object is to provide an improved rotary boring head for such an apparatus. Yet another object is to provide an improved rotary boring head comprising rotary cutters journaled on the head for rotation about relatively inclined axes and improved means for driving the cutters so that the latter rotate about their own axes as the head revolves. These and other objects and advantages of the invention will be clearly apparent to those skilled in the art.

In the accompanying drawings there is shown for purposes of illustration one form which the invention may assume in practice.

In these drawings:

Fig. 3 is a central longitudinally extending vertical section taken on line 3—3 of Fig. 2.

Fig. 4 is a detail vertical section taken on line 4—4 of Fig. 3.

Figure 1:
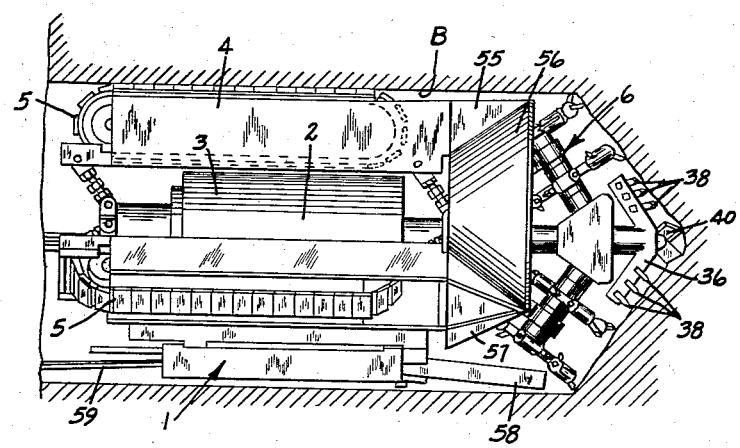
Fig. 1 is a side elevational view of a shaft or tunnel boring apparatus in which an illustrative form of the improved rotary boring head is embodied, the apparatus being shown in operating position in a mine vein.
Figure 2:
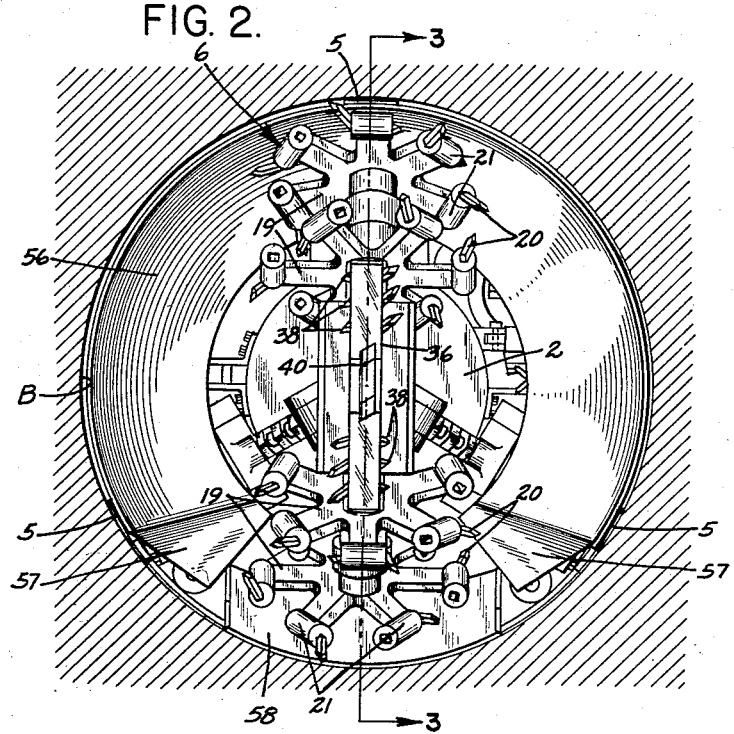
Fig. 2 is an enlarged front end elevational view of the rotary boring head shown in Fig. 1.

The improved rotary boring head is embodied in a shaft or tunnel boring apparatus, generally designated 1, which generally comprises a horizontal frame or body 2 providing a housing for a motor 3. The body 2 is mounted on longitudinally extending guide frames 4 for endless crawler treads 5 which engage the walls of a bore B formed by the rotary boring head, and these treads serve to support and propel the apparatus, in the manner fully disclosed in the application Serial No. 296,324, above referred to. The rotary boring head is generally designated 6 and comprises a rotary head frame 7 having its hub portion 8 formed integral with the longitudinally extending, centrally located, tubular drive shaft 9 journaled in bearings 10 suitably supported within a forward frame portion 11 of a gear housing 12 which constitutes the forward portion of the body 2 of the apparatus. The head frame 7 comprises diverging arms 13 extending outwardly and inclined forwardly from the hub portion 8 and these arms carry bearings 14 in which the outer portions of relatively inclined shafts 15 are journaled, these shafts inclined downwardly and rearwardly from the frame hub 8. The inner portions of these inclined shafts are journaled in bearings 16 supported in bearing supports 17 secured to a forward housing 18 integral with the forward portion of the head frame. Secured to these inclined shafts 15 at the opposite sides of the arms 13, as shown in Fig. 3, are rotary cutters or cutter wheels 19 arranged in a novel manner and which carry detachable cutter teeth 20. These teeth are provided with opposite cutting points and are reversible in sockets formed in lugs 21, and held in position in the lug sockets by usual set screws.

Now referring to the drive for the boring head, it will be noted that the motor 3 has a spur pinion 23 secured to its power shaft 24, and this pinion meshes with and drives a spur gear 25 secured to a longitudinally extending horizontal shaft 26 suitably journaled within the gear housing 12. Rotatable with gear 25 is a spur gear 27 meshing with and driving a spur gear 28 keyed to the rear end of a longitudinal shaft 29 journaled in bearings 30 and 31 supported respectively within the rear end of the tubular shaft 9 and the forward portion of the cutter frame hub 8. The shaft 29 extends axially through the shaft 9 (Fig. 3) to the hub of the head frame and has keyed to its forward portion a bevel gear 32 meshing with and driving bevel gears 33 keyed to the inner ends of the relatively inclined shafts 15 which support and drive the cutter wheels 19. A front plate 34 is secured to the gear housing 18 and provides a front closure for the housing chamber and supported within this plate is a bearing 35 for the forward portion of the shaft 29. The forward portion of the shaft 29 extends forwardly through an opening in the plate 34 and supports and is fixed to a rotary cutter 36 having outwardly and rearwardly diverging arms 37 extending in a common rearwardly open cone of rotation about the rotational axis of said boring head substantially duplicating a cone of rotation axially spaced to the rear therefrom of shafts 15 and which carry cutter teeth 38 similar to the teeth above described. The front rotary cutter 36 has a forwardly opening axial socket 39 which receives the shank of a detachable pilot bit or drilling cutter 40. Pilot bit 40 projects forward through the apex of a third cone of rotation duplicating and axially spaced forward from both of the other said cones of rotation. This third cone of rotation passes through the cutting heads of said cutter teeth 38 and through the cutting heads of the said detachable cutter teeth 20 which are in a rotationally forward position on rotary cutter wheels 19.

In this improved construction, also secured to the shaft 26 is a spur pinion 42 which meshes with and drives a spur gear 43 (Fig. 4) secured to a longitudinal shaft 44 arranged parallel with the shaft 26 and likewise suitably journaled within the gear housing 12. Meshing with the gear 43 is a spur gear 45 which is secured to a parallel shaft 46 likewise journaled within the gear housing 12 and rotatable with this shaft 46 is a spur gear 47 meshing with and driving a spur gear 48 secured to a parallel shaft 49 likewise suitably journaled in the gear housing 12. Meshing with and driven by the gear 48 is a spur gear 50 meshing with a spur gear 51 and driven by this latter gear is a spur pinion 52 meshing with and driving a large spur gear 53 having its hub keyed to the rear end of the shaft 9 which is secured to the head frame. Thus, during running of the motor 3, the head frame may be rotated about the axis of the shaft 9 and the cutter wheels 19 simultaneously rotate about the axes of the inclined shafts 15. The rotary cutter 36 and the pilot cutter 40 rotate in an opposite direction and at a speed higher than the rate of rotation of the head frame 7, while the cutter wheels 19 rotate about their own axes at a speed quite like that of the rotary cuter 36, and as the cutter wheels revolve about their own axes they concurrently turn about the head axis of the head frame. The cutter wheels, as the boring head revolves, cut along annular paths in the mine vein of earth formation, and as the head advances the wheel cutters effectively cut away the material, so that the material is effectively dislodged and disintegrated.

By rotating the forward cutters in a direction opposite to the direction of rotation of the head frame, the cutting forces of one tend substantially to offset, or counterbalance, those of the other. As a result of such an arrangement of the cutter of the boring head, the coal or other material being bored is effectively and rapidly dislodged and disintegrated.

Carried at the forward ends of the crawler tread frames 4 are forwardly tapering supports or wedge-shape frame members 55 to which a cone-shape or frustoconical, funnel-like, forwardly flared deflector plate 56 is secured, and this deflector plate extends outwardly with its peripheral edge lying close to the bore walls and the plate is cut away or open at its bottom at 57, to clear the sides of a front nose piece 58 of a conveying means 59 which receives the material dislodged by the boring head and which conveys the dislodged material rearwardly of the apparatus as is fully disclosed in the copending application Serial No. 296,324, above referred to.

During operation of the apparatus, the rotary boring head as it revolves may be fed forwardly by the endless crawler treads 5 which engage the walls of the bore B for supporting and propelling the apparatus. The rotating cutter wheels 19 and the revolving cutters 36 and 40 cut out and disintegrate the material of the mine vein or earth formation to form a circular bore B and the disintegrated material falls by gravity within the deflector and downwardly onto the front nose piece 58 of the conveyor means 59 and is conveyed rearwardly of the apparatus.

As a result of this invention, an improved shaft or tunnel boring apparatus is provided having an improved revolving boring head provided with rotating cutters which rotate about their own axes as the head revolves thereby effectively to dislodge and disintegrate the material. By the provision of the rotating cutting wheels arranged in the novel manner disclosed, a more effective boring action is attained. The boring head is not only effective in operation but is relatively simple and rugged in design, well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claim.

What I claim as new and desire to secure by Letters Patent is:

A boring head for boring a hole in an earth formation comprising a pilot bit, a front rotary cutter, and multiple axially spaced rotary cutter wheels, said pilot bit mounted at the rotational center of said front rotary cutter, said front rotary cutter having arms extending outwardly in a common rearwardly opening cone of rotation about the rotational axis of said boring head, cutter teeth mounted in said rotary cutter arms for continuous cutting contact with earth while boring, a rotatable positively driven head frame, shafts journaled on said head frame and extending outwardly in a cone of rotation duplicating and axially spaced to the rear from the cone of rotation of said front rotary cutter mounting arms, said multiple axially spaced rotary cutter wheels mounted on and driven by said shafts, cutter teeth mounted in said rotary cutter wheels, a third cone of rotation duplicating and axially spaced forward from both of the other said cones, said third cone of rotation passing through the cutting heads of said cutter teeth of the rotary cutter arms and through the cutting heads of said cutter teeth of the rotary cutter wheels which are in a rotationally forward position, and said pilot bit projecting forward through the apex of said third cone of rotation.

References Cited in the file of this patent

UNITED STATES PATENTS

| | | |
|---|---|---|
| 1,391,626 | Gilthorpe | Sept. 20, 1921 |
| 1,812,719 | Schroeder | June 30, 1931 |
| 1,826,396 | Gault | Oct. 6, 1931 |
| 2,550,202 | Robbins | Apr. 24, 1951 |
| 2,669,441 | Castanoli et al. | Feb. 16, 1954 |